United States Patent [19]

Stanczyk et al.

[11] Patent Number: 5,532,928
[45] Date of Patent: Jul. 2, 1996

[54] COMPUTER SYSTEM AND METHOD FOR WASTE ACCOUNTING, REDUCTION, AND EVALUATION

[75] Inventors: Thomas F. Stanczyk, North Tonawanda; Frank K. Milano, Williamsville; Mary P. Hintermeier, Cheektowaga, all of N.Y.

[73] Assignee: Recra Environmental, Inc., Amherst, N.Y.

[21] Appl. No.: 389,560

[22] Filed: Feb. 15, 1995

Related U.S. Application Data

[63] Continuation of Ser. No. 982,185, Nov. 25, 1992, abandoned.

[51] Int. Cl.⁶ .................................................. G06F 17/60
[52] U.S. Cl. .................. 364/406; 364/402; 364/478.01; 235/376; 235/385
[58] Field of Search .................................. 364/401, 402, 364/403, 468, 478; 235/376, 385

[56] References Cited

U.S. PATENT DOCUMENTS

| | | | |
|---|---|---|---|
| 4,394,567 | 7/1983 | Schönhuber | 235/375 |
| 4,455,483 | 6/1984 | Schönhuber | 235/375 |
| 4,567,359 | 1/1986 | Lockwood | 235/381 |
| 5,016,164 | 5/1991 | Srivastava | 364/200 |
| 5,055,660 | 10/1991 | Bertagna et al. | 235/472 |
| 5,057,677 | 10/1991 | Bertagna et al. | 235/381 |
| 5,136,698 | 8/1992 | Okamoto | 395/375 |
| 5,191,522 | 3/1993 | Bosco et al. | 364/401 |

OTHER PUBLICATIONS

"AWARE 1.0" Vendor: Recra Environmental, Inc.
AWARE®—A Waste Accounting, Reduction and Evaluation System, by Recra Environmental.
"Aware™—A Waste Accounting, Reduction and Evaluation System" prepared by Recra Environmental, Inc., Mar. 8, 1991.

Primary Examiner—Gail O. Hayes
Assistant Examiner—Joseph Thomas
Attorney, Agent, or Firm—Hodgson, Russ, Andrews, Woods & Goodyear

[57] ABSTRACT

A method and system for allocating cost of treatment, storage, and disposal of waste material generated to sites of generation thereof. At least one database containing information including sites of waste material generation and routes of possible flow of waste material after it is generated to disposal thereof is provided in a computer memory. Information containing the date, type, source, cost, and destination for each transaction of the waste material generated is input to the computer. The computer is operated to recursively search the inputted transactions to locate all transactions of the waste material having a type and destination which match the type and source of the previously located transactions respectively of the waste material for which cost is to be allocated and having transaction dates which are on or before the respective dates of subsequent transactions of the waste material in the flow routes respectively thereof to thereby locate sites of generation of the waste material. The cost of the treatment, storage, and/or disposal of the waste material is then allocated among the sites of generation thereof according to the inputted costs for the respective transactions of the waste material located during the search. Information for manufacturing activities is derived from a manufacturing database having established or assigned identification codes for the sites. Identification codes are assigned to the sites for input of waste material information which are the same respectively as the identification codes assigned therefor in the manufacturing database.

15 Claims, 2 Drawing Sheets

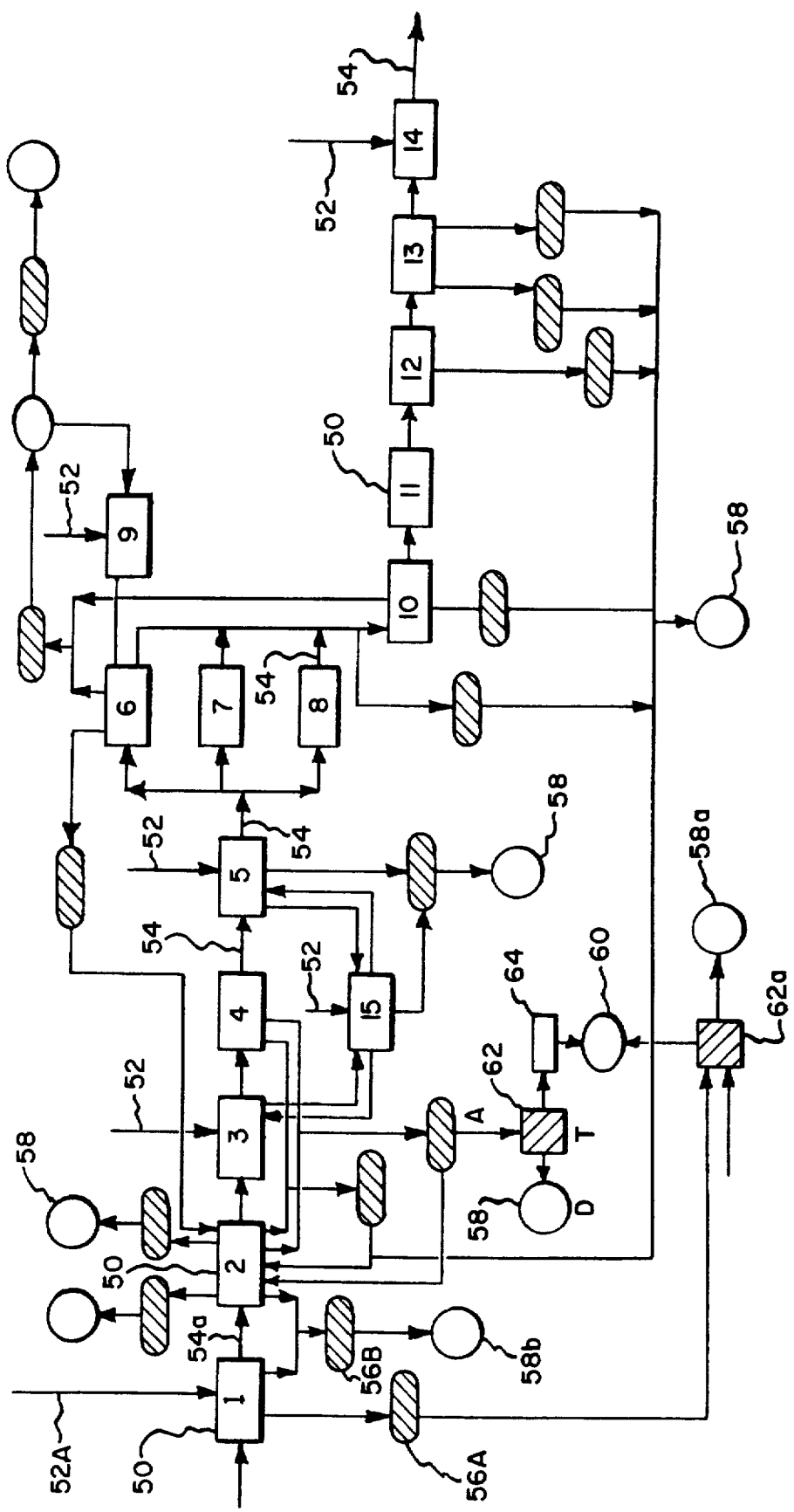

COMPUTER SYSTEM AND METHOD FOR WASTE ACCOUNTING, REDUCTION, AND EVALUATION

This is a continuation of application Ser. No. 07/982,185 filed on Nov. 25, 1992, now abandoned.

Businesses, large and small, generate and manage an array of measurements for purposes of analyzing the performance of individual operations in relationship to productivity, resource utilization, profitability, environmental compliance, and customer acceptance. The present invention relates to an integrated environmental information management system that utilizes a computer-aided software system to assimilate and evaluate manufacturing, financial, and environmental information and data in relationship to total quality management, pollution prevention and waste minimization initiatives. More particularly, the present invention relates to a computer-aided software system and integrated information management method for: accounting for usage of raw materials and raw material constituents during the production of one or more primary and secondary products; identifying and accounting for the generation frequency of 'total waste' at desired levels of interest; tracking 'total waste' movement and disposition; allocating costs associated with generating and managing the 'total waste' to the identified origins; and comparatively analyzing trends in 'total waste' generation rates and costs as a function of product output, ongoing waste minimization and pollution prevention initiatives, product revenue and source of generation.

"Total waste" in the context of this invention is defined as: off-spec product (that is, product not meeting specifications), process scrap, unused chemical inventory, solid wastes, multi-media releases of toxic chemicals, discarded chemical residues displaying hazardous characteristics, inefficient consumption of energy, water and chemical raw materials. "Waste material" as used herein and in the claims refers to any part of total wastes, but is not limited thereto.

Many businesses continue to adopt the principles of Total Quality Management ("TQM") to: improve their profitability, ensure sustained customer loyalty, continuously improve the quality of their products and their environmental management practices. The measurements associated with these initiatives are resulting in quantifiable reductions in production loss or 'total waste', which can directly be used to improve customer acceptance while enhancing competitive advantage.

Businesses are also demonstrating how commitments to TQM can lead to measurable reductions in the multi-media releases of toxic chemical pollutants (pollution prevention) as well as the associated costs attributable to production loss and the proper management of waste.

Both TQM and pollution prevention are proactive processes that dictate measurements documenting progress in continuous improvement. Without these measurements, employees motivated by awareness, attention to detail and understanding of both the origin and cause of 'total waste' will not achieve the goals associated with both TQM and pollution prevention programs.

To optimize the strategic value of these measurements beyond the sole purposes of regulatory compliance and production performance analysis, businesses are pursuing ways of interfacing conventional manufacturing and financial information systems with environmental management databases. The present invention allows these databases to be electronically integrated into one relational database that will supplement the measurements and progress reporting requirements associated with TQM continuous improvements as well as pollution prevention.

Magnifying the relative importance of an integrated environmental information system is the fact that businesses are faced with complying with an ever-increasing number of new environmental laws and regulations that dictate additional collection, management and reporting of waste data. As an example, federal and state legislation continues to emerge in areas related to pollution prevention, waste minimization and toxic use reduction, forcing businesses to account for generation rates of those hazardous wastes identified under the Resource Conservation and Recovery Act ("RCRA") and/or multi-media toxic chemical releases as a function of either product output, raw material consumption, and/or other related forms of production activity.

Industries, qualifying as large generators of RCRA hazardous waste are required to report annual waste generation quantities, methods of waste recycling, treatment and disposal and source reduction activities. Generators who ship RCRA hazardous waste off-site are required to certify that they have a program in place to minimize the volume and toxicity of the waste. In 1988, the U.S. Environmental Protection Agency (the "EPA") published guidelines as to what should be included in a written plan addressing the waste minimization certification requirements. Among the key elements are: tracking, accounting and the ability to allocate the real-costs of ongoing waste back to the source, all of which are key features of the invention.

In addition to the RCRA waste data collection and reporting requirements, businesses are also faced with a growing number of state laws prioritizing either pollution prevention, toxics use reduction and/or hazardous waste minimization as preferred environmental management strategies. As of 1992, over 25 states have adopted pollution prevention legislation. As many as 15 of these states require businesses to prepare written plans documenting how they will prevent or minimize waste generated and, on an annual basis, report progress in reducing waste generation. These plans focus on the origins of hazardous waste as well as the origins of chemical releases to air and water media. State-mandated progress reporting dictates measurements depicting 'waste' generating rates as a function of production activity as well as source reduction activity. The present invention calculates these measurements.

In 1990, Congress enacted into law the Pollution Prevention Act which imposes additional data collection and reporting requirements on businesses complying with the Superfund Amendments and Reauthorization Act of 1986, as amended, ("SARA"). The new Source Reduction and Recycling Reporting requirements dictate measurements in connection with releases of SARA 313 constituents prior to recycling, treatment and disposal as well as the off-site releases of SARA 313 constituents to air, publicly-owned waste treatment facilities, natural waterways, recycling facilities, energy recovery facilities and treatment and disposal facilities. The present invention allows businesses to document these releases by identified source and relate findings to source reduction activities and applicable production activity indices.

In 1991, the EPA, in conjunction with the Pollution Prevention Act, published its "National Comprehensive Pollution Prevention Strategy" which focuses on the reduction of toxic chemical releases by private industry, as well as the government sector, via voluntary actions. The present invention can document releases and analyze progress of voluntary actions undertaken to prevent or minimize the release of one or more targeted chemical constituents.

In short, multiple and complex requirements to more efficiently utilize and manage raw materials and chemical wastes are constantly being imposed upon industrial and manufacturing companies. Today's environment requires a vast amount of production and waste data to be collected, organized, and analyzed in a manner that will allow relational analyses to depict progress and accomplishments in improving the quality of the environment. There is a need for business managers to be able to efficiently store and access the voluminous data necessary to track progress being achieved in waste minimization programs and relate this data to production activity and financial performance of a business unit.

In a complex manufacturing system comprising a plant or a series of plants and/or a plurality of operation sites generating 'waste' material, it is also desirable to be able to allocate production loss including the cost of treatment, storage, and/or disposal of a specific waste material when several sites may have contributed to the generation thereof, to the origin or source.

It is accordingly an object of the present invention to provide an efficient and user friendly system for tracking and accounting for all 'total waste' generation from its inception at a site to its final disposal.

It is a further object of the present invention to provide the capability in such a system for allocating the total cost of treatment, storage and/or disposal of waste material in a complex network of sites back to the original sites of generation thereof.

It is another object of the present invention to provide the capability for more easily and efficiently relating waste transactions in such a complex network to production output and/or raw material usage as a function of individual source reduction initiatives.

In order to allocate the total cost of treatment, storage and/or disposal of waste material back to the sites of generation thereof, in accordance with the present invention at least one database containing information including sites of waste material generation and routes of possible flow of waste material after it is generated to disposal thereof is provided in a computer, information is inputted to the computer containing the type, source, cost and destination of waste material generated, treated, stored and/or disposed for each transaction thereof, and the computer is operated to search the inputted transactions to locate all transactions of waste material whose type and destination match the type and source of the previously located transactions respectively of waste materials for which cost is to be allocated and whose transaction dates are on or before the respective dates of subsequent transactions of the waste material in the flow routes respectively thereof, and operating the computer to allocate the cost of the treatment, storage and/or disposal of the waste material among the sites of generation thereof according to the inputted costs for the respective transactions of the waste material located during the search.

In order to more easily and efficiently relate waste material transactions to production at more than one site, in accordance with the present invention at least one database is provided in a first program module containing information including sites of waste material generation and routes of possible flow of waste material after generation thereof, the first program module is provided in a computer, a second program module is provided which contains a database interactive with the first program module database for receiving information regarding waste material generation, treatment, storage, and/or disposal at the sites, the second program module is provided in the computer for interaction between the databases of the first and second program modules, a third program module is provided which contains a database for receiving from a manufacturing database information regarding manufacturing activities at the sites each having an assigned identification code, the third program module is provided in the computer, a fourth program module is provided which contains a database interactive with the first, second, and third program module databases for relating waste material generation, treatment, storage, and/or disposal to manufacturing activities at the sites, the fourth program module is provided in the computer, information is inputted to the second program module database relative to waste material generation, treatment, storage, and/or disposal at the sites including assigned site identification codes, which are the same respectively as the assigned identification codes for the sites in the manufacturing database, and the computer is operated to provide an output relating waste material generation, treatment, storage, and/or disposal to manufacturing activities whereby the same identification code identifies a site in both the second and third program module databases.

The above and other objects, features, and advantages of the present invention will be apparent in the following detailed description of the preferred embodiments thereof taken in conjunction with the accompanying drawings wherein like reference numerals denote the same or similar parts throughout the several views.

BRIEF DESCRIPTION OF THE DRAWINGS

FIG. 2 is a diagram illustrating a database which may be provided in the system and containing information including sites of production and of waste material generation and routes of possible flow of waste material after it is generated to disposal thereof.

DETAILED DESCRIPTION OF PREFERRED EMBODIMENTS

Figure 1:
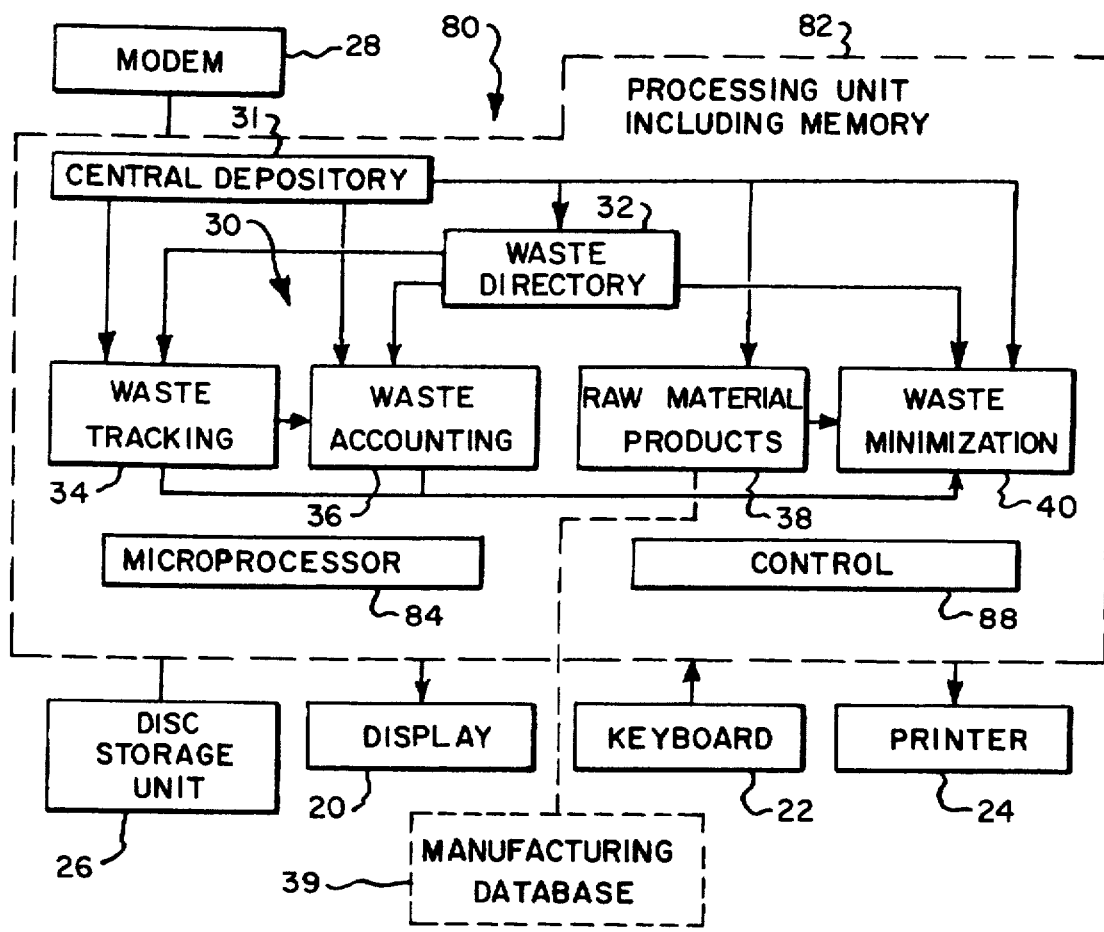
FIG. 1 is a diagram illustrating the structure of a system in accordance with the present invention.

Referring to FIG. 1, there is illustrated generally at 80 a computer system employing a processing unit 82 including a memory. The processing unit includes a conventional microprocessor block 84 and a conventional control block 88 which functions to control input/output operations and the interaction between the microprocessor block 84 and the memory.

The computer system 80 further includes a group of conventional peripheral units including a display device 20, a keyboard 22, a printer 24, a disk storage unit 26, and a modem 28. The system 80 may suitably utilize, but is not limited to, an 80386 IBM compatible computer having a 80 MB, DOS 3.0 or greater, and memory of 640K (suitably 2.5 MB). The software may include, but is not limited to, Harvard Presentation Graphics, R&R Report Writer Runtime (a Concentric Data Systems product), Foxpro Runtime (a product of Microsoft of Redmont, Washington). The code generator may, for example, be Genifer software provided by Bytel Corp. of California. However, it should be understood that the present invention may include any other suitable computer/software package. Since the details of the abovedescribed components form no part of the present invention and since they can be conventionally found in the prior art, they will not be described in greater detail herein.

A more detailed description thereof may be found in U.S. Pat. No. 4,831,552 to Scully et al, which is incorporated herein by reference.

In accordance with the present invention there is provided a database package, illustrated generally at 30, comprising, in the illustrated embodiment, five separate program or database modules, i.e., a waste directory module 32, a waste tracking module 34, a waste accounting module 36, a raw material/products management module 38, and a waste minimization module 40, interactively connected in the memory of the processing unit 82 as described in greater detail hereinafter. The memory also includes a central depository 31 for providing pre-assigned site identification codes and the like.

The computer system 80 may be a portion of a complete environmental information management system wherein it is interactively connected to, but separate and independent of, a financial database for accounting, budgeting, and cost analysis, a manufacturing database, illustrated at 39, for inventory, purchasing, and production, and an environmental database for compliance with various government regulations and having a chemical reference and a laboratory information management system.

The waste directory module 32 database contains information including sites of waste material generation and routes of possible flow of waste material after it is generated to sites of treatment, storage, and/or disposal thereof, both on and off plant premises. As used herein and in the claims, the term "site" is meant to include any source of waste or unit operation or group of operations as may be designated including portions of operations and may refer to an entire plant or facility. For example, a site may be a molding machine or a painting or chemical treatment operation or perhaps an entire plant. Sites also include operations or locations for treatment, storage, or disposal of waste material. The information as to sites and flow routes is inputted to the waste directory module 32 by a particular waste generator based upon the particular characteristics of its facility or facilities. Referring to FIG. 2, there is illustrated at 48 a diagram of information which may be inputted into the waste directory module 32 of waste generation and flow to and from a plurality of manufacturing sites 50 in an exemplary portion of a manufacturing plant. Each of the manufacturing operations 50 performs a specific function, i.e., one may be a molding operation, another may be a heat treatment operation, another may be a chemical treatment operation, etc. Alternatively, each of the manufacturing sites 50 may represent a separate manufacturing plant. Some of the manufacturing sites 50 may be in one manufacturing plant and others thereof may be in another plant. There are fifteen manufacturing sites 50 shown having, for ease of illustration, individual designations 1 through 15. At 56 are illustrated waste streams. Sites of disposal of waste are illustrated at 58; sites of reclamation or recycling of waste are illustrated at 60; waste treatment or separation sites are illustrated at 62; and waste storage sites are illustrated at 64.

Flow of raw materials to a manufacturing site is illustrated at 52, and flow of goods or semi-finished goods from one manufacturing site to another or to a customer is illustrated at 54, this representating information which may be inputted to the raw material/products module 38 as discussed hereinafter.

As illustrated in FIG. 2, the routes of possible flow of waste material can comprise a complex network wherein an individual waste flow or disposal may constitute waste generated at several sites. For example, manufacturing site 1 may be a chemical treatment site wherein the flow of a chemical thereto is illustrated at 52A. The chemically treated product is transferred to manufacturing site 2, as illustrated at 54a. During the chemical treatment process, a waste is generated, and a waste stream therefrom is illustrated at 56A. This waste stream is treated or undergoes a process of separation, as illustrated at 62a, and then finally disposed of at, for example, an incinerator, as illustrated at 58a. Site 1 as well as site 2 generate a second waste material the flow of which from both manufacturing sites is illustrated at 56B and is finally disposed of, as illustrated at 58b. Thus, a single site can produce more than one waste stream, and the same waste stream may be provided from more than one site. The 15 manufacturing sites 50 and the associated waste streams shown in FIG. 2 may represent only a small number of the total number of sites and waste streams in a complex manufacturing operation. In addition to providing the routing of waste from generation to disposal, the database for the waste directory may, for example, suitably include for each waste material pertinent physical properties, chemical content, hazard characteristics, approved methods of managing the material within the plant and/or off-facility, approved shipping containers and/or storage tanks for bulk blending, pertinent manifest data, designated commercial vendors, and appropriate waste codes.

As illustrated in FIG. 1, the waste directory module 32 may be interactively used with any of the modules 34, 36, and 40, and these other modules may be interactively used with others of the modules, and the present invention does not require the use of all 5 modules. If desired, other modules may be added to the 5 modules shown in FIG. 1 for other suitable purposes.

When used in combination with the waste directory module 32, the waste tracking module 34 contains a suitable database to provide "cradle to grave" tracking of waste regardless of hazard or medium. The level of detailed tracking, which may be on a daily basis, is user controlled, allowing waste to be tracked at each of the sites and allowing tracking of even individual containers. If desired, scrap may be included in total waste. The user may have the option of tracking individual waste from the point of generation directly to the point of disposal, and off-facility shipments for waste treatment and/or disposal may be validated against the waste directory and the central depository.

When used in combination with the waste directory 32 and the waste tracking module 34, the waste accounting module 36 is provided with a suitable database to summarize transactions from the waste tracking module on, for example, a monthly basis and/or may summarize data for previous years. Manual input may also be allowed. The software for the waste accounting module 36 may be suitably provided for full accounting capabilities of all waste transactions, i.e., monthly closes, audit reports, etc. The software for this module 36 may be suitably provided to produce various reports and graphics which can be used to analyze specific trends relating to the generation and management of waste on a plant as well as corporate level.

The resulting databases for the waste tracking and accounting modules 34 and 36 respectively thus provides what might be called a "snapshot" of waste management practices on a plant, departmental, or company-wide basis.

The raw material/products module 38 provides a suitable database for receiving manufacturing data such as, for example, raw material usage, raw material constituent analysis, and product output from the separate and independent manufacturing database 39, wherein the sites 50 may have assigned identification codes. Manual input may also be allowed. The user of the manufacturing database 39 may be a different department of a company than the user of the modules 32, 34, 36, 38, and 40.

The waste minimization module 40 provides a suitable database which, in combination with the waste directory, waste accounting or waste tracking, and raw material/products modules, may be used to suitably report progress on a wide variety of corporate, plant, or departmental waste reduction endeavors including illustrating success of waste minimization projects on an operation, plant, corporate, or product basis, relate waste generation to product produced or type and volume of raw material used, illustrate reduction of "waste" over specified time periods, and project trends and success rates of various pollution and waste prevention projects. The waste minimization module 40 receives manufacturing information from the raw material/products database 38 and waste generation information from the waste tracking or waste accounting module 34 or 36 respectively to thus relate waste material generation, treatment, storage, and/or disposal to manufacturing activities in the complex network of sites and possible flow routes stored in module 32. A purpose for which the waste minimization module 40 may be used is to demonstrate less waste per raw material used or product produced.

The software for the modules herein described may be developed using principles commonly known to those of ordinary skill in the art to which this invention pertains.

In order to track waste generation, treatment, storage, and disposal, the "routing" mechanism provided by the waste directory 32 is provided to input all possible routes of waste flow in a facility or network. The user should preferably input the plant identification code as well as a site identification code since the software may be developed for tracking multi-facility transactions. In addition to inputting to the waste tracking or accounting module the sites from which waste is being generated or moved, the user should also input the type of waste being generated, treated, stored, or disposed of, and the site to which it is being moved. The waste directory routes are used in the tracking and accounting modules 34 and 36 respectively to compare with an inputted route to validate that the waste transaction is valid. By "transaction", as used herein and in the claims, is meant a movement of waste or other material from one site to another. A transaction thus amounts to a "footprint" in the system to track waste generation, treatment, storage, and disposal. The site from which waste is moved during a transaction is called herein a "source", and the site to which waste is moved during a transaction is called a "destination". A source should not be confused with a site at which waste is generated, although a source may be a waste generation site. A destination should not be confused with the site of ultimate disposal of the waste, although a destination may be the ultimate disposal site. The destination in one transaction may become the source in the subsequent transaction. The tracks of a quantity of waste from generation to disposal may thus include several transactions.

Total waste is accounted for by using a user specified accounting period which is automatically "closed". Any changes made to the transaction data must then be made through adjustment transactions. The summarized data stored in the waste accounting module 36 may be used for the majority of relational reporting. This eliminates the need to store daily transactions in the waste tracking module 34 on-line for extended periods of time (i.e., from year to year) thus reducing the amount of long-term on-line storage required. Using such summarized transactions also expedites report generation because there are fewer data records to read and report on.

In order to avoid double accounting for transactions which represent waste movement (i.e., into/out of storage) instead of waste generation, the user should include a "flag" in the routing record wherein the user inputs whether transactions using the route should be considered waste generation at the transaction source or just waste movement. The tracking and accounting modules may desirably be programmed to specify that certain transactions, for example, any transaction whose destination is an off-site operation should be counted as a waste shipment whether or not this "flag" is set.

Figure 3:
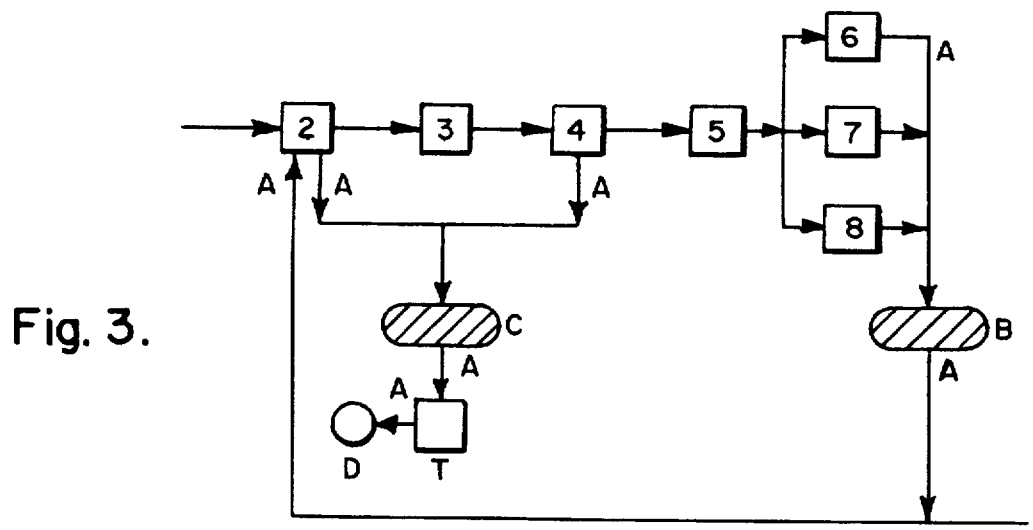
FIG. 3 is a portion of the diagram of FIG. 1 and provided for ease of illustration.

For ease of illustration, FIG. 3 is a portion of the diagram of FIG. 2. As illustrated in FIG. 2 and again in FIG. 3, a single disposal, illustrated at D in FIG. 3, of waste A may have its origin at any of various manufacturing sites 50. As illustrated in FIG. 3, the waste A could have originated in manufacturing sites 2 and/or 4. However, some or all of the waste may not have originated in site 2 but have instead passed through site 2, having originated in sites 6, 7, and/or 8 and passing to site 2 as waste stream B and/or, as shown in FIG. 2, originating in sites 10, 12, and/or 13. Thus, waste A may have originated at any one of 8 different sites or at a combination of 2 or more of those sites. It is desirable to be able to effectively and easily allocate the total cost of treatment, storage, and disposal of an amount of waste in such a complex network back to the original site or sites of generation thereof.

In order to easily and effectively allocate total cost of treatment, storage, and disposal of waste back to the original site or sites of generation thereof, in accordance with the present invention the software (waste tracking module 34 and/or waste accounting module 36) includes a place for the user to enter cost in each tracking/accounting transaction and to specify the site (on- or off-premises) the waste is being sent to for treatment, storage, or disposal, and includes a procedure for recursively following the transaction "footprints" back to the transaction representing waste generation. An algorithm for such a recursive search, illustrated in an exemplary program which is included at the end of this specification, would contain the following steps:

1. Obtain transaction representing final disposal of waste for which it is determined that costs are to be allocated;
2. Search the transactions for a transaction:
   a. whose destination and waste type match the source and waste type specified in the last transaction found in the flow stream, i.e., the subsequent transaction in the flow stream, and
   b. whose transaction date is on or before the date of the subsequent transaction in the flow stream of this particular quantity of waste found.
3. Accumulate any costs specified for this transaction; and
4. Repeat Steps 2 and 3 until no more transactions are found.

With reference to FIG. 3, Table I illustrates an application of the recursive algorithm.

TABLE I

| Transaction | Plant | Source | Waste | Destination | Date |
|---|---|---|---|---|---|
| 1 | 48 | T | A | D | 4-5-92 |
| 2 | 48 | 4 | A | T | 1-5-92 |
| 3 | 48 | 2 | A | T | 3-5-92 |

TABLE 1-continued

| Transaction | Plant | Source | Waste | Destination | Date |
|---|---|---|---|---|---|
| 4 | 48 | 6 | A | 2 | 2-5-92 |

Referring to Table 1 and FIG. 3, for example, 10,000 pounds of a waste A are disposed of at a cost of $1,000, and it is desired to allocate that cost between sites at which the waste is generated. Using the waste tracking module 34 and/or waste accounting module 36 to recursively search for the origins of the waste, the first transaction located is of a waste stream whose source is a waste treatment site T, whose destination is disposal site D, and which is of type A. All of the sites for this example are within plant 48. Thus, the first line of Table I shows this transaction 1 by plant, source, waste, destination, and date. The search continues this time looking for a transaction whose destination is T. The search locates transaction 2 wherein 2,000 pounds of waste of the type A was generated at site 4 and whose destination was waste treatment facility T. Further recursive searching does not show any transaction wherein the destination of waste of type A was site 4. As previously discussed, this second transaction must have been on a date on or before the subsequent transaction in the flow stream for this 2,000 pounds of waste, i.e., on or before the date of transaction 1. The date of an earlier transaction in the waste stream must have been on or before the date of disposal of the waste to which costs are to be allocated. Thus, in Table I transaction 2 is shown to have occurred before subsequent transaction 1. Additional recursive searching with waste treatment facility T being the destination results in the finding of a transaction (transaction 3 in Table I) of 8,000 pounds of waste of the type A from site 2 with the destination being waste treatment facility T on or before the date of transaction 1 (the subsequent transaction in the flow stream of this 8,000 pounds of waste). Further recursive searching for a transaction whose destination is site 2 results in finding transaction 4 of 8,000 pounds of type A waste whose origin is site 6 and whose destination is site 2 on a date on or before the date of transaction 3 (the subsequent transaction in the flow stream of this 8,000 pounds of waste). Thus, two sites have been located to which the cost of disposal of the waste at disposal site D is to be allocated, i.e., site 4 responsible for 2,000 pounds, and site 6 responsible for 8,000 pounds. Prorating the $1,000 cost of disposal between the waste generation sites 4 and 6 based upon the percentage of the total waste which each is responsible for, $200 is allocated to site 4, and $800 is allocated to site 6.

In a typical company, the user or users of the system 80 would be different from the user or users of the manufacturing database 39 in that a waste disposal department would operate the computer system 80 while a production department may operate the database 39 and have established identification codes for the manufacturing sites 50. As previously discussed, the raw material/products module 38 receives production and raw material usage information from the manufacturing database 39, acts as a repository of this information, and supplies it to the waste minimization module 40, which relates this information to the information from the waste tracking and/or waste accounting modules 34 and 36 respectively to provide, for example, a comparison of waste material generated to amount of raw material used or amount of product produced. In order for the waste minimization module 40 to provide such a comparison, the site identification codes inputted to the modules 32, 34, and 36 must correspond to or match the site identification codes used with the manufacturing database 39 respectively. In order to provide such a match of site identification codes, in accordance with the present invention the system 80 is arranged to require inputting of site identification codes which are established to correspond to the site identification codes respectively used in operation of the manufacturing database 39. Site identification codes which may be inputted to the system 80 are stored in the central depository 31 which may be said to act as a "spell-check" to ensure that legitimate codes are inputted to each of the modules so that each module uses the same code for a site. In order to more effectively and easily relate production and raw materials usage to waste generation, in accordance with the present invention the central depository 31 is thus provided to store site identification codes for use in the modules 32, 34, and 36, which are the same as site identification codes used in the manufacturing database 39 so that it is unnecessary to "translate" the site identification codes in information received from the manufacturing database 39 by the raw material/products module 38. For example, the manufacturing database 39 may use the identification code A101 for site 11 in FIG. 2. When this site is provided with an identification code to be stored in the central depository 31, the code stored therein will also be A101 so that information regarding this site whether from the waste directory, waste tracking, or waste accounting modules 32, 34, and 36 respectively or from the manufacturing database 39 will have the same identification code A101. Thus, all information received by the waste minimization module 40 from the raw material/products module 38 as well as the other modules 32, 34, and 36 will desirably bear the same identification code for each respective site.

To account for "total waste" regardless of the hazard or the medium to which the waste is released (i.e., air, water, or solid), the waste directory 32 may be programmed so that the user may specify the medium and the hazard therein and so that these "flags" are available in all other modules which reference the waste code with which they are specified.

To expedite data entry in tracking and accounting transactions, the waste characterization data may be stored in the waste directory 32. This characterization data may be tied to a waste code. In waste accounting or tracking, the user then only needs to enter the waste code and all other characterization data is automatically available for reporting.

If desired, the waste tracking module 34 may be programmed to automatically summarize tracking transactions and electronically transfer the summarized transactions into the waste accounting module 36 to eliminate redundant data entry which would otherwise be necessary if the user wanted to use tracking (daily transactions) and accounting (monthly or other periodic transaction summaries).

In order to provide the user with the flexibility to customize the system for all fields requiring a coded value, a series of look-up tables may be provided which the user can fill in and which can be referenced by any program needing them. These look-up tables may be provided for use by data entry screens for validation of coded fields and to provide a "pick list" capability for the referenced field. These look-up tables may then be used by the Report Writer to print the expanded value of the coded field on reports (i.e., vendor name instead of vendor code). In order to account for not only total waste generation but also pollutant loadings, the waste directory 32 may be programmed so that the user may enter a complete chemical composition analysis including minimum/maximum percent by weight or volume or an average concentration. This chemical composition will then be available any time the waste code is referenced. For example, once the total waste generation value is calculated by summarizing waste accounting/tracking transactions, it may be combined with the chemical composition data to derive the total amount of a given constituent generated by applying the percent or concentration of the constituent from the waste analysis to the total amount of waste generated.

Using the principles and information contained herein, a computer programmer of ordinary skill in the art can devise a suitable program for carrying out the present invention.

It should be understood that while the present invention has been described in detail herein, the invention can be embodied otherwise without departing from the principles thereof, and such other embodiments are meant to come within the scope of the present invention as defined by the appended claims.

What is claimed is:

1. A computer-implemented method of operation on a computer to allocate the cost of treatment, storage, and/or disposal of a specific waste material generated to sites of waste material generation comprising the steps of:
   a. providing at least one database containing information including sites of waste material generation and routes of possible flow of waste material after it is generated to disposal thereof;
   b. inserting said database implemented on said computer;
   c. inputting to said computer information containing the date, type, source, cost, and destination for each transaction of waste material generated;
   d. inputting to said computer identification of waste generation sites:
   e. operating said computer to recursively search said inputted transactions to locate all transactions of waste material having a type and destination which match the type and source of said transaction of said specific waste material and continuing to operate said computer to recursively search back to at least one waste generation site said inputted transactions to respectively locate all transactions of waste material having a type and destination which match the type and source of previously located transactions respectively of waste material wherein the destinations are sources respectively of said previously located matching transactions and having transaction dates which are on or before the respective dates of subsequent transactions of waste material in the flow routes respectively thereof to locate sites of generation of waste material which match the quantity and type of said specific waste material; and
   f. operating said computer to allocate the cost of the treatment, storage, and/or disposal of said specific waste material among the located matching sites of waste material generation according to the inputted costs for the respective transactions of waste material located during the search.

2. A method according to claim 1 wherein the step of inputting information includes inputting chemical constituents of the waste material.

3. A method according to claim 1 wherein the step of inputting information includes inputting physical and chemical properties of the waste material.

4. A method according to claim 1 wherein the step of inputting information includes inputting for each of the transactions the identity of a plant at which waste material is generated, treated, stored, and/or disposed.

5. A system utilizing a computer to allocate the cost of treatment, storage, and/or disposal of a specific waste material generated to sites of waste material generation comprising a computing device having a memory, means including at least one database implemented on said computer in the memory which contains information including sites of waste material generation and routes of possible flow of waste material after it is generated to disposal thereof, means for inputting to said computer information containing the date, type, source, cost, and destination for each transaction of waste material generated, means for inputting to said computer identification of waste generation sites, and means for recursively searching the inputted transactions to locate all transactions of waste material having a type and destination which match the type and source of said transaction of said specific waste material and for continuing to recursively search the inputted transactions back to at least one waste generation site to respectively locate all transactions of waste material having a type and destination which match the type and source of previously located transactions respectively of waste material and having transaction dates which are on or before the respective dates of subsequent transactions of waste material in the flow routes respectively thereof to locate sites of generation of waste material which match the quantity and type of said specific waste material whereby said computing device is operated to allocate the cost of the treatment, storage, and/or disposal of the specific waste material among the located matching sites of waste material generation according to the inputted costs for the respective transactions of waste material located during the search.

6. A system according to claim 5 wherein said means for inputting information includes means for inputting the physical and chemical constituents of the waste material.

7. A system according to claim 5 wherein said means for inputting information includes means for inputting the chemical properties of the waste material.

8. A system according to claim 5 wherein said means for inputting information includes means for inputting for each of the transactions the identity of a plant at which waste material is generated, treated, stored, and/or disposed.

9. A computer-implemented method of tracking waste material between sites of generation, treatment, storage, and/or disposal thereof comprising the steps of:
   a. providing at least one database in a first program module containing information including sites of waste material generation and routes of possible flow of waste material after generation thereof;
   b. inserting said first program module in a computer;
   c. providing a second program module containing a database interactive with said first program module database for receiving information regarding waste material generation, treatment, storage, and/or disposal at said plurality of sites;
   d. inserting said second program module in said computer for interaction between said databases of said first and second program modules;
   e. providing a third program module containing a database for receiving from a manufacturing database information regarding said plurality of sites each of which sites has an assigned identification code in the manufacturing database;
   f. inserting said third program module in said computer;
   g. providing a fourth program module containing a database interactive with said first, second, and third program module databases for tracking waste material generation, treatment, storage, and/or disposal to the plurality of sites;
   h. inserting said fourth program module in said computer for interaction between said databases of said first, second, and third modules;

i. inputting to said second program module database information relative to waste material generation, treatment, storage, and/or disposal at said plurality of sites including inputting assigned identification codes for said sites which are the same respectively as the assigned identification codes for said sites in the manufacturing database; and j. operating the computer to interact between said databases of said first, second, third, and fourth modules to effectuate an output tracking waste material generation, treatment, storage, and/or disposal between said plurality of sites whereby the same identification code identifies a site in both the second and third program module databases.

10. A method according to claim 9 wherein said manufacturing database includes information relative to at least one of production output and raw material usage.

11. A method according to claim 9 further comprising preassigning identification codes for said plurality of sites which are the same respectively as the identification codes for said sites in the manufacturing database.

12. A computer-implemented method of operation on a computer to allocate the cost of treatment, storage, and/or disposal of a specific waste material to sites of waste material generation comprising the steps of:

a. providing at least one database in a first program module containing information including sites of waste material generation and routes of possible flow of waste material after generation thereof;

b. inserting said first program module implemented on said computer;

c. providing a second program module containing a database interactive with said first program module database for receiving information regarding waste material generation, treatment, storage, and/or disposal at said plurality of sites;

d. inserting said second program module implemented on said computer for interaction between said databases of said first and second program modules;

e. providing a third program module containing a database for receiving from a manufacturing database information regarding said plurality of sites each of which sites has an assigned identification code in the manufacturing database;

f. inserting said third program module implemented on said computer;

g. inputting to said third program module information from the manufacturing database regarding said plurality of sites;

h. providing a fourth program module containing a database interactive with said first, second, and third program module databases for tracking waste material generation, treatment, storage, and/or disposal to the plurality of sites;

i. inserting said fourth program module implemented on said computer for interaction between said databases of said first, second, and third modules;

j. inputting to said second program module database information relative to waste material generation, treatment, storage, and/or disposal at said plurality of sites including inputting assigned identification codes for said sites which are the same respectively as the assigned identification codes for said sites in the manufacturing database;

k. operating said computer to interact between said databases of said first, second, third, and fourth modules to effectuate an output tracking waste material generation, treatment, storage, and/or disposal between said plurality of sites whereby the same identification code identifies a site in both the second and third program module databases;

l. inputting to said computer information containing the date, type, source, cost, and destination for each transaction of waste material generated;

m. inputting to said computer identification of waste generation sites;

n. operating said computer to recursively search said inputted transactions to locate all transactions of waste material having a type and destination which match the type and source of said transaction of said specific waste material and continuing to operate said computer to recursively search back to at least one waste generation site said inputted transactions to respectively locate all transactions of waste material having a type and destination which match the type and source of previously located transactions respectively of waste material wherein the destinations are sources respectively of said previously located matching transactions and having transaction dates which are on or before the respective dates of subsequent transactions of waste material in the flow routes respectively thereof to locate sites of generation of waste material which match the quantity and type of said specific waste material; and o. operating said computer to allocate the cost of the treatment, storage, and/or disposal of said specific waste material among the located matching sites of waste material generation according to the inputted costs for the respective transactions of waste material located during the search.

13. A method according to claim 12 further comprising inputting to said computer identification of chemical constituents of the waste material.

14. A method according to claim 12 further comprising inputting to said computer identification of physical and chemical properties of the waste material.

15. A method according to claim 12 further comprising inputting to said computer for each of the transactions the identity of the plant at which waste material is generated, treated, stored, and/or disposed.

* * * * *